A. P. STEPHENSON.
Sorghum-Hoe.
No. 54,791.
Patented May 15, 1866.
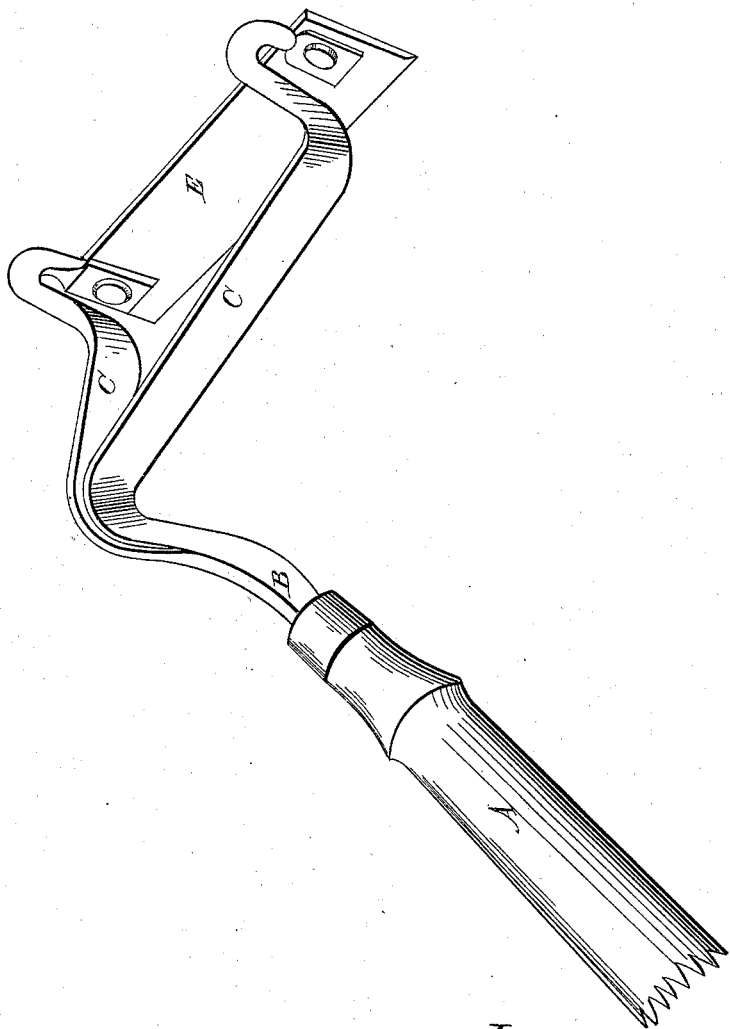

UNITED STATES PATENT OFFICE.

A. P. STEPHENSON, OF EQUALITY, ILLINOIS.

IMPROVEMENT IN SORGHUM-STRIPPERS.

Specification forming part of Letters Patent No. 54,791, dated May 15, 1866.

*To all whom it may concern:*

Be it known that I, A. P. STEPHENSON, of Equality, Gallatin county, and State of Illinois, have invented a new and Improved Tool for Topping, Stripping, and Cutting Sorghum and other Canes; and I do hereby declare that the following is a full, clear, and exact description thereof, which will enable those skilled in the art to make and use the same.

The drawing is a perspective view of my improved tool, a portion of the handle being removed.

My invention has for its object the furnishing a convenient tool by which the operations of topping, stripping, and cutting sorghum and other canes may be performed quickly and easily; and it consists of a tool constructed as hereinafter more fully described.

A is the handle of the tool, a convenient length for which is found to be about two feet. To the lower end of the handle A is attached the shank B of the tool. A short distance below the end of the handle A the shank B divides into two branches or knives, C. These knives or strippers C are made of half-round iron—that is to say, the outer side of said strippers C is rounded, but the inner side is flat—and they are designed to strip the leaves from the stalk of cane, as hereinafter more fully described.

The ends of the strippers C are bent into a swan-neck form, as shown in the drawing, and to their ends is attached the cutting-knife E. This knife may be attached to the swan-neck ends of the knives or strippers C by rivets or screws. The latter I prefer, as the knife may be more easily removed and replaced when broken.

The manner of using the tool is as follows: The top of the stalk or cane is cut off by a blow of the tool, the end of the stalk slips into the space between the knives C C E, and as the tool descends the leaves are stripped from the stalk, and when the tool reaches the lower end of said stalk it is in position for cutting it off. Thus with one blow the cane is topped, stripped, and cut, thereby greatly diminishing the labor and time necessary in preparing it for the mill.

What I claim as new, and desire to secure by Letters Patent, is—

A tool, constructed substantially as described, for topping, stripping, and cutting sorghum and other canes.

The above specification of my invention signed by me this 1st day of September, 1865.

A. P. STEPHENSON.

Witnesses:
W. McEVOY,
JOHN C. YOST.